(12) United States Patent
Renner

(10) Patent No.: US 11,203,227 B2
(45) Date of Patent: Dec. 21, 2021

(54) WHEEL FOR A VEHICLE

(71) Applicant: MUBEA CARBO TECH GMBH, Salzburg (AT)

(72) Inventor: Christoph Renner, Gosau (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 449 days.

(21) Appl. No.: 16/091,027

(22) PCT Filed: Feb. 17, 2017

(86) PCT No.: PCT/EP2017/053719
§ 371 (c)(1),
(2) Date: Oct. 3, 2018

(87) PCT Pub. No.: WO2017/174248
PCT Pub. Date: Oct. 12, 2017

(65) Prior Publication Data
US 2019/0111730 A1    Apr. 18, 2019

(30) Foreign Application Priority Data
Apr. 4, 2016 (EP) .................................. 16163759

(51) Int. Cl.
*B60B 5/02*    (2006.01)
*B60B 3/04*    (2006.01)
(Continued)

(52) U.S. Cl.
CPC ................ *B60B 5/02* (2013.01); *B60B 3/044* (2013.01); *B60B 3/10* (2013.01); *B60B 23/06* (2013.01);
(Continued)

(58) Field of Classification Search
CPC .. B60B 5/02; B60B 3/04; B60B 3/041; B60B 3/042; B60B 3/044; B60B 3/045; B60B 3/047; B60B 3/10
See application file for complete search history.

(56) References Cited

U.S. PATENT DOCUMENTS 2,805,894 A    9/1957   Gilbert
4,108,232 A *  8/1978   Simpson ................. B60B 21/12
                                                152/513

(Continued)

FOREIGN PATENT DOCUMENTS

DE    10 2013 114 343 A1    7/2015
EP         0 826 518 A2    3/1998
(Continued)

*Primary Examiner* — Jason R Bellinger
(74) *Attorney, Agent, or Firm* — Pauley Erickson & Swanson

(57) ABSTRACT

A wheel includes a rim that is at least partially made from a fiber reinforced plastic. The rim has an inner side extending to the hub region of the wheel and an outer side extending centrifugally away from the hub region of the wheel whereby the outer side includes a well which is interconnected with an outer shoulder by a transition area. A wheel center is interconnected with the inner side of the rim by at least one fastener wherein the at least one fastener penetrates the rim via at least one opening that extends from the inner side of the rim to the outer side of the rim. An annular cover is arranged at the outer side of the rim in a circumferential direction around the wheel and thereby covers the at least one fastener and/or the at least one opening.

15 Claims, 4 Drawing Sheets

(51) Int. Cl.
    *B60B 3/10*         (2006.01)
    *B60B 23/06*      (2006.01)
    *B60B 1/14*         (2006.01)
    *B60B 21/12*       (2006.01)
    *B60B 21/06*       (2006.01)
    *B60B 23/08*       (2006.01)

(52) U.S. Cl.
    CPC ............ *B60B 1/14* (2013.01); *B60B 21/068* (2013.01); *B60B 21/12* (2013.01); *B60B 23/08* (2013.01); *B60B 2310/305* (2013.01); *B60B 2360/341* (2013.01); *B60B 2900/111* (2013.01); *B60B 2900/311* (2013.01)

(56) References Cited

U.S. PATENT DOCUMENTS

| | | | |
|---|---|---|---|
| 4,448,456 A * | 5/1984 | Pfundstein | B60B 1/00 |
| | | | 301/108.5 |
| 5,538,329 A | 7/1996 | Stach | |
| 6,019,149 A | 2/2000 | Stringer | |
| 6,325,462 B1 | 12/2001 | Hummel et al. | |
| 6,758,533 B1 | 7/2004 | Hummel et al. | |
| 7,918,513 B2 * | 4/2011 | Wilson | B60B 5/02 |
| | | | 301/64.702 |
| 8,925,603 B2 * | 1/2015 | Gittani | B60B 1/047 |
| | | | 152/381.5 |
| 10,377,172 B2 * | 8/2019 | Werner | B60B 23/08 |
| 2004/0095014 A1 * | 5/2004 | Veux | B60B 21/068 |
| | | | 301/58 |
| 2011/0089749 A1 | 4/2011 | Kleber et al. | |
| 2014/0346845 A1 | 11/2014 | Renner | |
| 2015/0352897 A1 * | 12/2015 | Huidekoper | B60B 23/08 |
| | | | 301/11.1 |
| 2016/0325582 A1 * | 11/2016 | Werner | B60B 5/02 |
| 2017/0087929 A1 * | 3/2017 | Walls-Bruck | B60B 5/02 |
| 2017/0334240 A1 | 11/2017 | Renner et al. | |
| 2019/0061420 A1 | 2/2019 | Renner | |
| 2019/0135032 A1 * | 5/2019 | Chenault, III | B60B 3/02 |

FOREIGN PATENT DOCUMENTS

| | | |
|---|---|---|
| EP | 1 858 715 B1 | 11/2007 |
| EP | 3 228 473 A1 | 10/2017 |
| FR | 1 114 895 A | 4/1956 |
| GB | 27835 A | 6/1914 |
| WO | WO 98/33666 A1 | 8/1998 |
| WO | WO 2006/097856 A2 | 9/2006 |
| WO | WO 2007/146260 A2 | 12/2007 |
| WO | WO 2013/045618 A1 | 4/2013 |
| WO | WO 2014/058313 A1 | 4/2014 |
| WO | WO 2015/090276 A1 | 6/2015 |
| WO | WO 2015/106760 A1 | 7/2015 |
| WO | WO 2016/066161 A1 | 5/2016 |
| WO | WO 2016/066162 A1 | 5/2016 |
| WO | WO 2016/066769 A1 | 5/2016 |

* cited by examiner

WHEEL FOR A VEHICLE

The subject application claims priority as a 371 application from PCT/EP2017/053719 filed on 17 Feb. 2017 which is a continuation of EP16163759 filed on 4 Apr. 2016. This application relates to the subject matter disclosed in a co-pending European Patent Application EP16163759 that is entitled "Wheel for a vehicle" which is commonly assigned by Mubea Carbo Tech GmbH and the disclosure of which is expressly incorporated herein by reference.

BACKGROUND OF THE INVENTION

Field of the Invention

The present invention relates to a wheel for a vehicle comprising a rim made of composite material and a wheel center made from the same or a different material, such as a lightweight metal alloy, the wheel further comprising an annular cover means to support fitting of a tire.

Discussion of Related Art

Light vehicle wheels are desirable to improve the driving quality and performance as well as to keep the overall vehicle weight low. Due to advances in material research, the wheel material is further shifted to light-metal and composite materials, which are light, durable and able to bear high loads at the same time. Hybrid-wheels made from a combination of fiber reinforced plastics as well as conventional materials, such as light weight metal alloys or different types of fiber reinforced plastics, provide very good results with respect of mechanical performance as well as aesthetic requirements. In these types of wheels, typically the wheel center and the rim are made as different entities and are then merged by interconnecting them with fastening means.

WO 2006/097856 A2 was published on 21 Sep. 2006 on behalf of Dymag Racing UK Ltd. and discloses a vehicle wheel that comprises a rim made from a plastic material and a spoke unit or wheel disk made from a metal. The spoke unit or wheel disk is connected to the rim by means of at least one connecting element that is guided through the rim base.

WO 2016/066769 A1 was published on 6 May 2016 on behalf of the applicant of the present application. The document discloses a wheel that comprises a rim and a wheel center, the wheel center being interconnected with the rim. The rim comprises at least one first contact area and the wheel center comprises at least one second contact area which in a mounted state are aligned with respect to each other. An intermediate layer is arranged between the at least one first and the at least one second contact area, preventing at least partially direct contact between the at least one first and the at least one second contact are. Thus i.a. the life expectancy of the wheel can be increased.

WO 2016/066162 A1 was published on 6 May 2016 on behalf of ThyssenKrupp Carbon Components GmbH and discloses a method for producing a vehicle wheel with a connection between a rim and a wheel disc. The wheel disc is connected to the wheel rim by means of at least one connecting element that is guided through a through-hole of the rim base and is joined in the wheel disc. After the joining of the connecting element in the wheel disc the document proposes that a portion of the head of the connecting element remains projecting beyond the rim base on the outer side of the rim, and subsequently the head of the connecting element is at least partially removed.

WO 2016/066161 A1 was published on 6 May 2016 on behalf of ThyssenKrupp Carbon Components GmbH and discloses a vehicle wheel having a wheel rim and a wheel disc which is connected to an inner side of the wheel rim, wherein the wheel disc is connected to the wheel rim by means of at least one connecting element which is guided through a through-hole of the rim base and is inserted in the wheel disc. The through-hole is arranged in the tire seat of the rim base and the connecting element, which is guided through, is joined substantially in the direction of the radial extension of the wheel disc which is associated to the tire seat on the inner side of the rim. The document also discloses a method for producing a vehicle wheel wherein the connection between wheel rim and wheel disc is produced in the region of the tire seat of the rim base, and, after the insertion of the connecting element into the wheel disc, a portion of the connecting element, which protrudes the contour of the outer side of the rim of the tire seat, is shaped so that the connecting element is adjusted to conform to the contour of the outer side of the rim of the tire seat.

SUMMARY OF THE INVENTION

Multipart wheel designs comprising an interconnected rim and a wheel center thereto offer the possibility of using different materials for the rim and the wheel center and to design and arrange the material of the components in an optimized manner. In particular this allows to obtain wheels with low weight and low moment of inertia by combining rims made from especially light materials with wheel centers made from more conventional materials. Furthermore, two part wheels enable certain designs of the wheel center that cannot be realized with wheels made in one part. In addition pairings of different metals, including magnesium, aluminum, titanium or steel, may be chosen. Within the context of the present invention, "aluminum", "magnesium" and "titanium" should be understood as meaning also their alloys.

The invention as disclosed herein is particularly advantageous if used for wheels having a wheel center that comprises a wheel star with spokes. However, the invention may also be advantageous for certain types of wheels that have a wheel center which is a wheel disc.

The usage of composite materials may decrease the mass and moment of inertia of wheels even more if compared to designs using metals only. As such, fiber reinforced plastics comprising e.g. glass fibers, carbon fibers, aramid fibers, basalt fibers or combinations thereof may be used for rims and/or wheel centers. Such types of wheels made from fiber reinforced plastics and metals can be referred to as "hybrid wheels". A first type of hybrid wheels comprises a wheel center made from a metal, while the rim is made from a fiber reinforced plastic. A second type comprises a rim made from a metal, while the wheel center is made from a fiber reinforced plastic.

A major drawback of many wheels made from multiple materials is that the load transfer between wheel center and rim in many cases turns out to be critical, which particularly holds true for wheels comprising rims made from fiber reinforced plastics. In these wheels typically fastening elements such as screws extend from the wheel center via an opening in the rim to the outer (centrifugal) side of the rim, where the fastening means is typically mechanically interconnected with the rim surface, as e.g. by means of a head portion. This usually results in a localized load transfer and consequently stress concentration in the rim in a region adjacent to the fastening elements—a region which typically is already weakened by the opening where the fastening elements are arranged. In order to optimize load transfer and to reduce stress concentration in the rim one typically tries to distribute load by means of specially designed fastening means. In particular screws with relatively large heads show potential for such optimization.

However, using such types of screws (respectively fastening elements) may cause problems when fitting a tire. As such, during mounting of a tire conventional fastening means may cause damage to a tire—in particular to the bead region of tires. Such damage may arise during fitting when the tire slides from the outer rim shoulder via the well to the inner rim shoulder, or vice versa. In addition the fastening means may interfere with the tire when in mounted state (e.g. during operation of the tire) and cause leakage of pressurized air from the tire. In the wheels known from the prior art usually the fastening means and/or the rim are modified in order to reduce the fraction of the fastening means that protrudes from the centrifugal face of the rim. However this approach typically has a negative effect on distribution of stress in this region and/or on the mechanical competence of the rim.

Another drawback of such wheels is, that in many cases final positioning of the tire relative to the rim is only obtained by means of inflation of the tire. Portions of fastening elements present on a rim's shoulders, the well or the transition region between these two regions may interfere with the tire and anticipate a proper tire/rime-space that can be inflated.

It is one object of the present invention to provide an improved wheel comprising a rim and a wheel center that are made as separate components and if appropriate from different materials and shows a better performance for fitting a tire and at the same time has a high mechanical competence.

According to the invention, a wheel typically comprises a rim that is at least partially made from a fiber reinforced plastic and which has an inner side directed to the hub region of the wheel and an outer side directed centrifugally away from the hub region of the wheel. The outer side of the rim comprises a well which is interconnected with an outer shoulder by means of a transition area. The wheel further comprises a wheel center that is interconnected with the inner side of the rim by means of at least one fastening means, the at least one fastening means penetrating the rim via at least one opening that extends from the inner side of the rim to the outer side of the rim. The wheel furthermore comprises at least one annular cover means arranged at the outer side of the rim in circumferential direction around the wheel and thereby covering the at least one fastening means and/or the at least one opening.

In order to support fitting of a tire particularly efficiently the at least one annular cover means may comprise a first transition part that aligns with the well and a second transition part that at least partially aligns with the transition area and if appropriate a third transition part that aligns with the outer shoulder. The first, second and third transition part may be integrally interconnected.

For some types of wheels the first and the third transition parts may be formed as essentially cylindrical rings and the second transition part may be formed as an essentially conical ring.

According to a variation of the present invention the third transition part aligns with an outer hump of the outer shoulder.

For wheels comprising certain types of fastening means the at least one annular cover means may comprise at least one recess cavity to receive at least part of the fastening means. According to a variation of the invention the wheel comprises a screw or a rivet, the head of which being at least partially arranged in the recess cavity. Thus, mechanical loading in the regions of the rim adjacent to the fastening means can be optimized.

In a variation of the invention the recess cavity is interconnected to the first and/or the second and/or the third transition means by means of a chamfer and or a fillet. Hence, fitting of a tire can be facilitated. Good results may be obtained if the at least one recess cavity is arranged at the second transition part which during fitting of a tire allows to position the tire in particularly controlled manner.

A mechanically highly competent wheel may be obtained if the at least one cover means in circumferential direction comprises a first end portion and a second end portion wherein the first end portion is arranged between the rim and the second end portion. Hence the wheel can be efficiently mechanically augmented in the region of the fastening means.

Alternatively, the at least one cover means in circumferential direction comprises multiple segments, each segment in circumferential direction comprising a first end portion and a second end portion wherein the first end portions and the second end portions of adjacent segments overlap with each other. Hence, assembly of some wheels that have certain rim geometries and/or fastening elements can be facilitated.

Wheels with a particularly good mechanical competence and low weight may be obtained if the at least one annular cover means is at least partially made from a fiber reinforced plastic. As such, fiber reinforced plastics comprising e.g. glass fibers, carbon fibers, aramid fibers, basalt fibers or combinations thereof may be used.

In a variation the at least one annular cover means comprises fibers that are arranged primarily in circumferential direction of the wheel.

Particularly good mechanical performance may be obtained if at least one layer of fibers extends from the first to the second to the third transition part. The at least one layer may be a fabric.

In order to increase durability of the wheel, the at least one annular cover means may comprise at least one sealing layer that is impermeable to pressurized air, respectively pressurized gas. Hence leakage of pressurized air (respectively gas) can be prevented or at least decreased. The sealing layer may be made e.g. from a silicone. For some applications, the sealing layer may be an outer coating of the annular cover means.

Hence, according to a variation of the present invention, the at least one annular cover means may additionally or alternatively act as a barrier layer that is impermeable to gas to be filled in the tire/rim-volume. Therefore, the annular cover means may e.g. comprise a layer made from a polymeric substance. Thus, stress corrosion cracking and leaking of pressurized gas through micro-cracks may be reduced. Good results may be obtained if such a barrier layer comprises a material that has a higher elasticity (elastic modulus) than the matrix of the fiber reinforced plastic of the rim, e.g. a silicone material, in particular a silicone varnish. Using a material with a relatively high elasticity allows reliable sealing of micro-cracks (or even larger cracks) that open due to cyclic loading or changes in wheel temperature. For some applications, the barrier layer may comprise multiple may comprise multiple layers made from the same and/or from different materials.

In a variation of the present invention, the at least one annular cover means comprises an (outer) coating layer that increases friction of a tire mounted on the rim. Hence, relative movements between the tire and the rim can be prevented. In one embodiment, the outer (directed away from the rim) surface of the at least one annular cover means is fully coated with a coating layer that increases friction of the tire to be mounted on the rim. In another embodiment, the outer surface of the at least one annular cover means is only partially coated with a coating layer that increases friction of the tire to be mounted on the rim.

In order to further facilitate fitting of a tire on the wheel, the at least one annular cover means may comprise an outer coating that is at least partially made from a material having a low coefficient of friction. Thus, friction between the tire and the annular cover means can be decreased during the fitting process and hence proper positioning of the tire relatively to the rim can be improved.

In a variation of the present invention, the at least one annular cover means comprises a coating layer that increases friction of a tire mounted on the rim. Good results may be obtained if the third transition part comprises such a coating as it may help to prevent a tire to misalign during operation.

Particularly durable wheels may be obtained if the annular cover means is interconnected with the rim by means of an adhesive agent. The adhesive agent may be at least partially formed as film that extends over the interfacial region between the annular cover means and the rim. Good results may be obtained if the interstitial region between the annular cover means and the rim is essentially filled with an adhesive agent.

The present application is also directed to an annular cover means as described herein. Such an annular cover means may be used for retrofitting a wheel.

This application relates to the subject matter disclosed in a co-pending European patent application No. 16163759.0 that is entitled "Wheel for a vehicle" which is commonly assigned by Mubea Carbo Tech GmbH and the disclosure of which is expressly incorporated herein by reference.

Certain aspects of the present invention may also be described as follows: A variation of an annular cover means may comprise a ring with a first cylindrical section and a second conical section arranged to fit optimally to the shape of the wheel's rim while covering the openings of the fastening means over the whole circumference of the rim. This enhances the sealing and can prevent gas leakage of the tire volume. The shape of the second conical section of the annular cover means may correspond to a conical rim section adjacent to the outer hump of the rim where the fastening means of certain wheels are arranged. The contact between the wheel and the annular cover means may be further maximized by the first cylindrical section of such a variation of an annular cover means which is formed to at least partially fit to the substantially cylindrical rim section adjacent of the rim's surface where the fastening means are placed. However, other shapes of the two sections are possible depending on the placement of the fastening means on the rim and the individual shape of the latter. Furthermore, different numbers of ring sections are possible. Generally, adding a second adjacent section to the section covering the openings may be applied to provide a larger overall surface of the annular cover means to glue and seal it to the rim.

If appropriate, the annular cover means may further exhibit recess cavities to accumulate e.g. the heads of fastening means of the connecting elements. The use of recess cavities may prevent uneven contact between the rim and the annular cover means caused by the protruding parts of the fastening elements and therefore enhance the sealing quality further. In a variation of the invention the recess cavities are formed as individual lenticular pockets covering the heads of two fastening means of each spoke. Alternatively, the pockets may accommodate a different number of heads of fastening means and/or incorporate more than the heads of the fastening means from one spoke. Consequently, other shapes of the recess cavities are possible. In addition, the recess cavities can further be filled with sealing material.

The annular cover means is preferably made from composite material and/or injection molded material. It can further be slit in one or multiple places between the recess cavities in order to be fitted over the rim and reconnected at the slit ends. Alternatively, other solutions are possible, comprising shrinking material that can be put over the rim surface and shrunk through heat supply to seal the opening and the heads of the fastening means.

It is to be understood that both the foregoing general description and the following detailed description present embodiments, and are intended to provide an overview or framework for understanding the nature and character of the disclosure. The accompanying drawings are included to pro-vide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
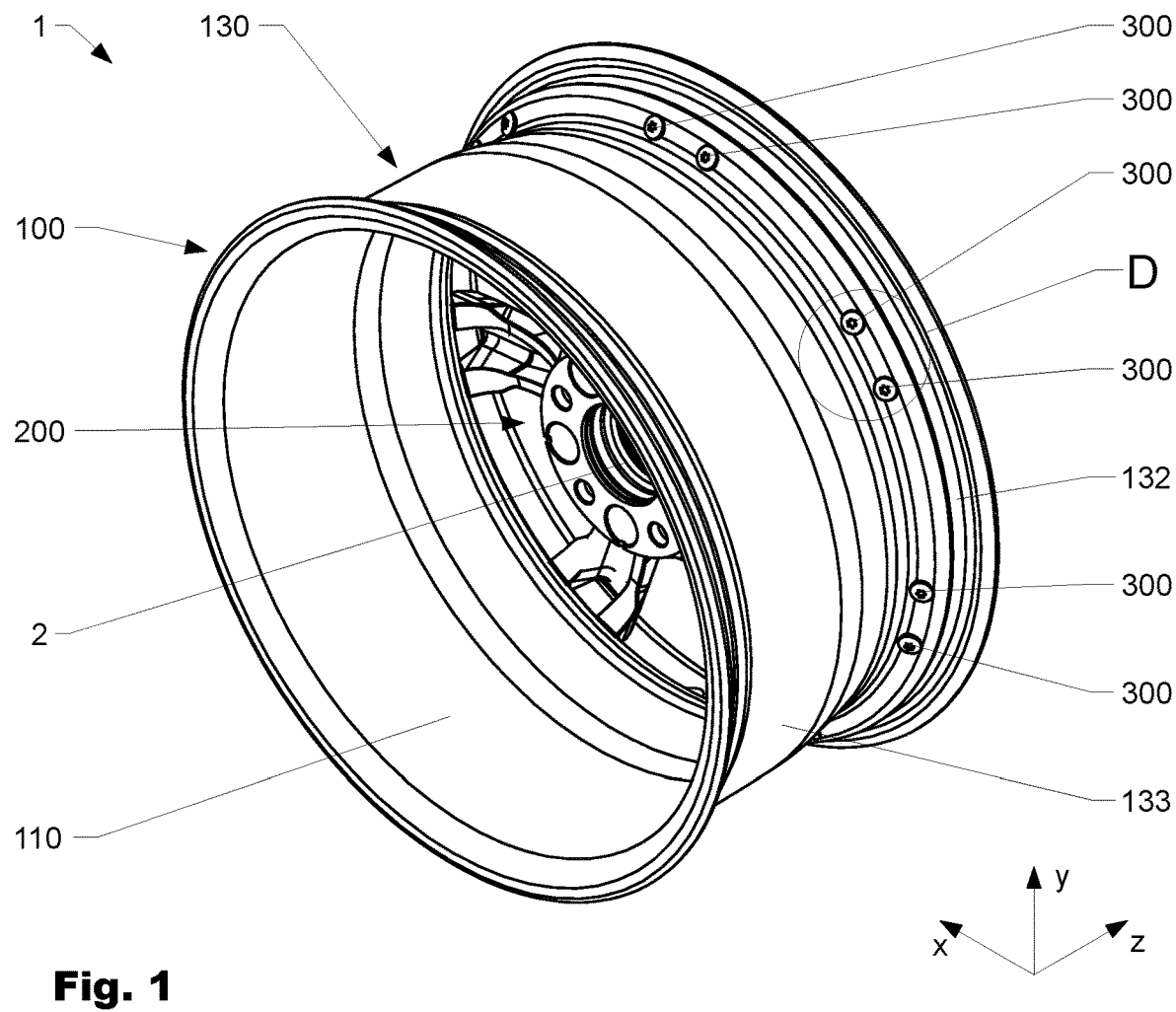
FIG. 1 schematically shows a wheel.
Figure 2:
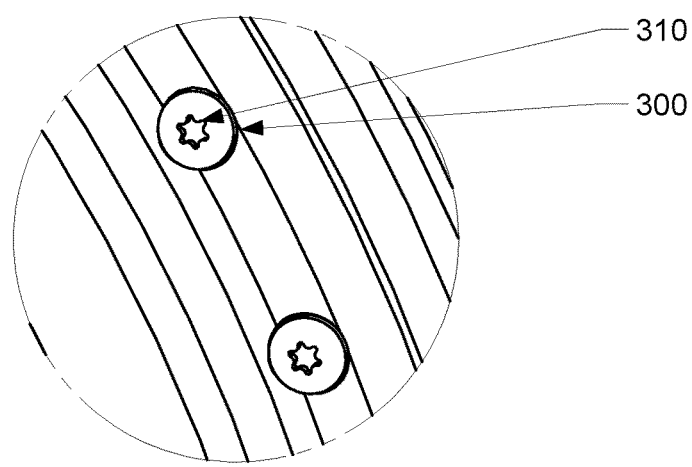
FIG. 2 shows detail D of FIG. 1.

FIGS. 1 and 2 show an embodiment of a wheel 1 comprising a rim 100 made from a fiber reinforced plastic and having an inner side 110 that is directed to the hub region 2 of the wheel, and an outer side 130 directed centrifugally away from the hub region 2 of the wheel 1. As well, the embodiment of a wheel 1 shown comprises a wheel center 200 made from aluminum and arranged at an inner side 110 of the rim 100. The rim 100 comprises an outer shoulder 132, as well as a well 133. The wheel center 200 and the rim 100 are mechanically interconnected by fastening means 300 that are in this embodiment screws. The fastening means 300 are partially screwed into the spokes of the wheel center 200 (not shown in detail) and are arranged in openings (not shown in detail) in the rim 100. The fastening means 300 comprise heads 310 that are arranged at the outer side 130 of the rim 100. In the embodiment of a wheel 1 shown, the fastening means 300 are arranged such that they protrude from the rim 100 in the transition area 134 between the rim's well 133 and the second shoulder 132. As the screw heads 310 protrude from the surface of the rim 100, a tire (not shown) to be mounted on the rim 100 may be damaged by the screw heads 310 during the fitting process when one of the tire's sidewalls will have to pass the region where the screw heads 310 are arranged.

Figure 3:
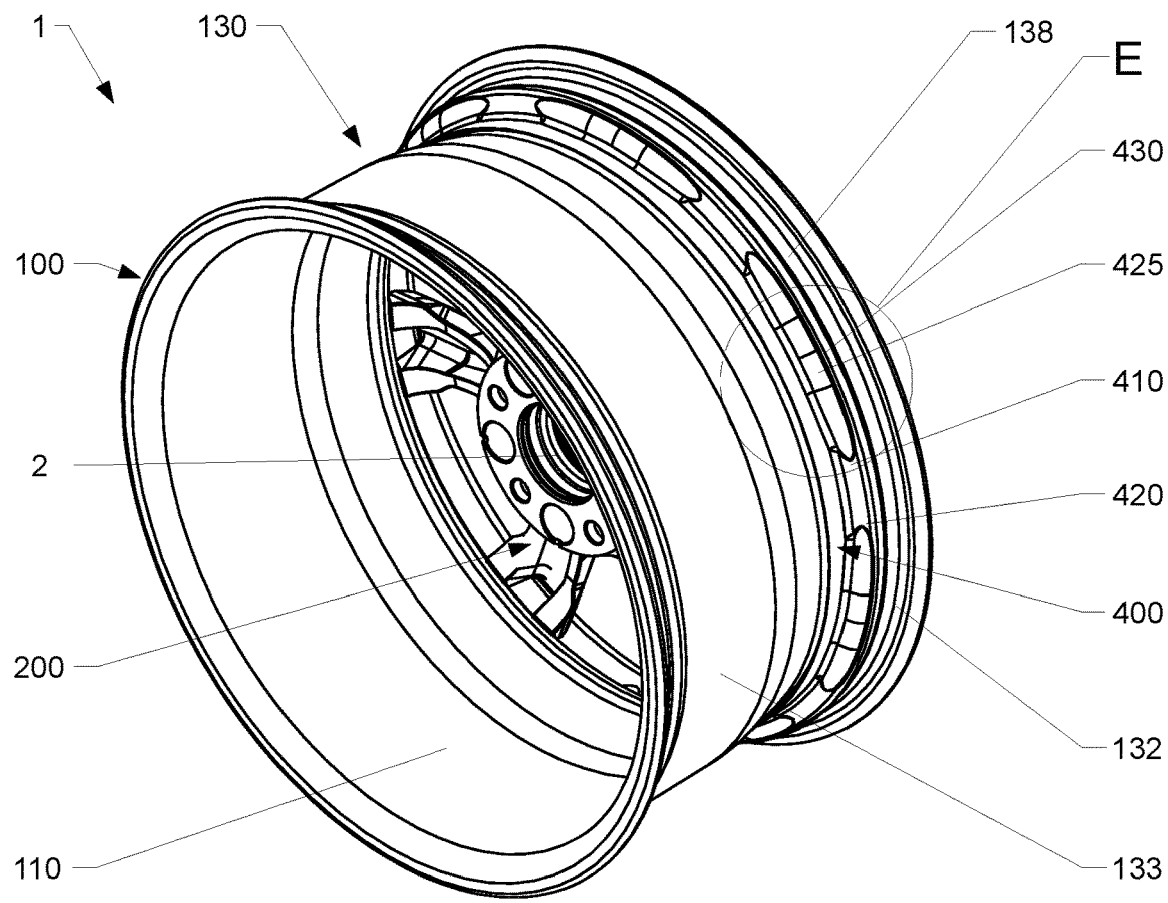
FIG. 3 schematically shows a first embodiment of a wheel according to the present invention.
Figure 4:
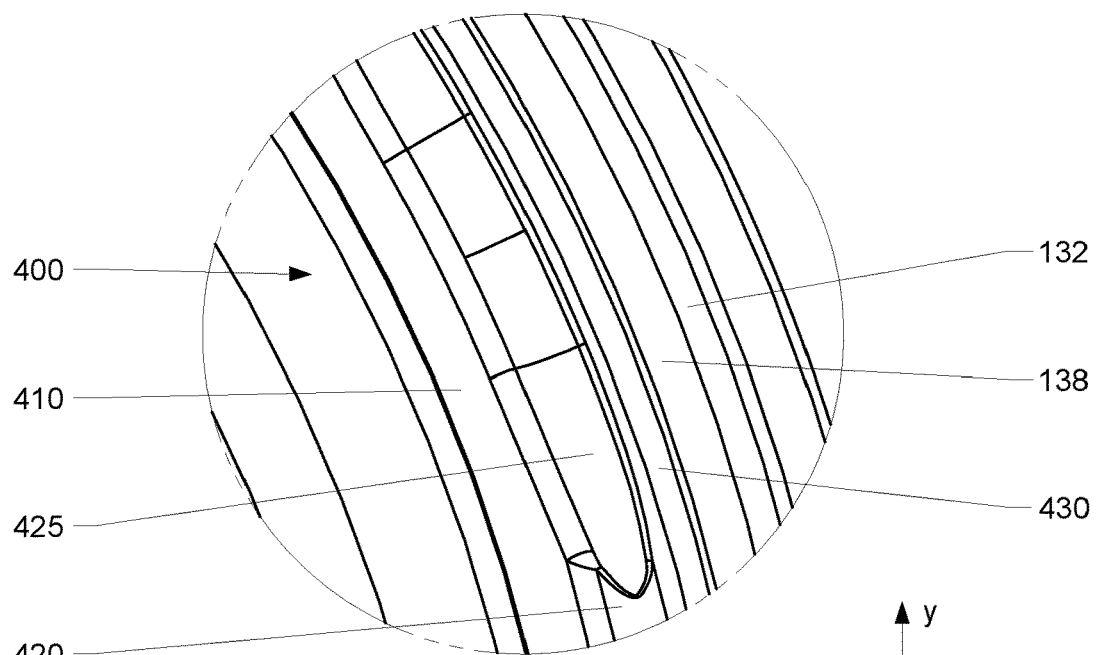
FIG. 4 shows detail E of FIG. 3.

FIGS. 3 and 4 show a wheel 1 according to one embodiment of the present invention. As can be seen, the fastening means 300 are covered by an annular cover means 400. The annular cover means 400 shown comprises a first transition part 410 that aligns with the well 133 and a second transition part 420 that partially aligns with the transition area 134 of the rim 100. As well, the annular cover means 400 comprises a third transition part 430 that aligns with the outer hump 138 of the outer shoulder 132. The annular cover means 400 extends in circumferential direction 405 around the rim 100, similar to a belt or band. The second transition part 420 comprises recess cavities 425 in which the screw heads 310 are arranged, as will be shown in more detail in subsequent FIG. 5.

Figure 5:
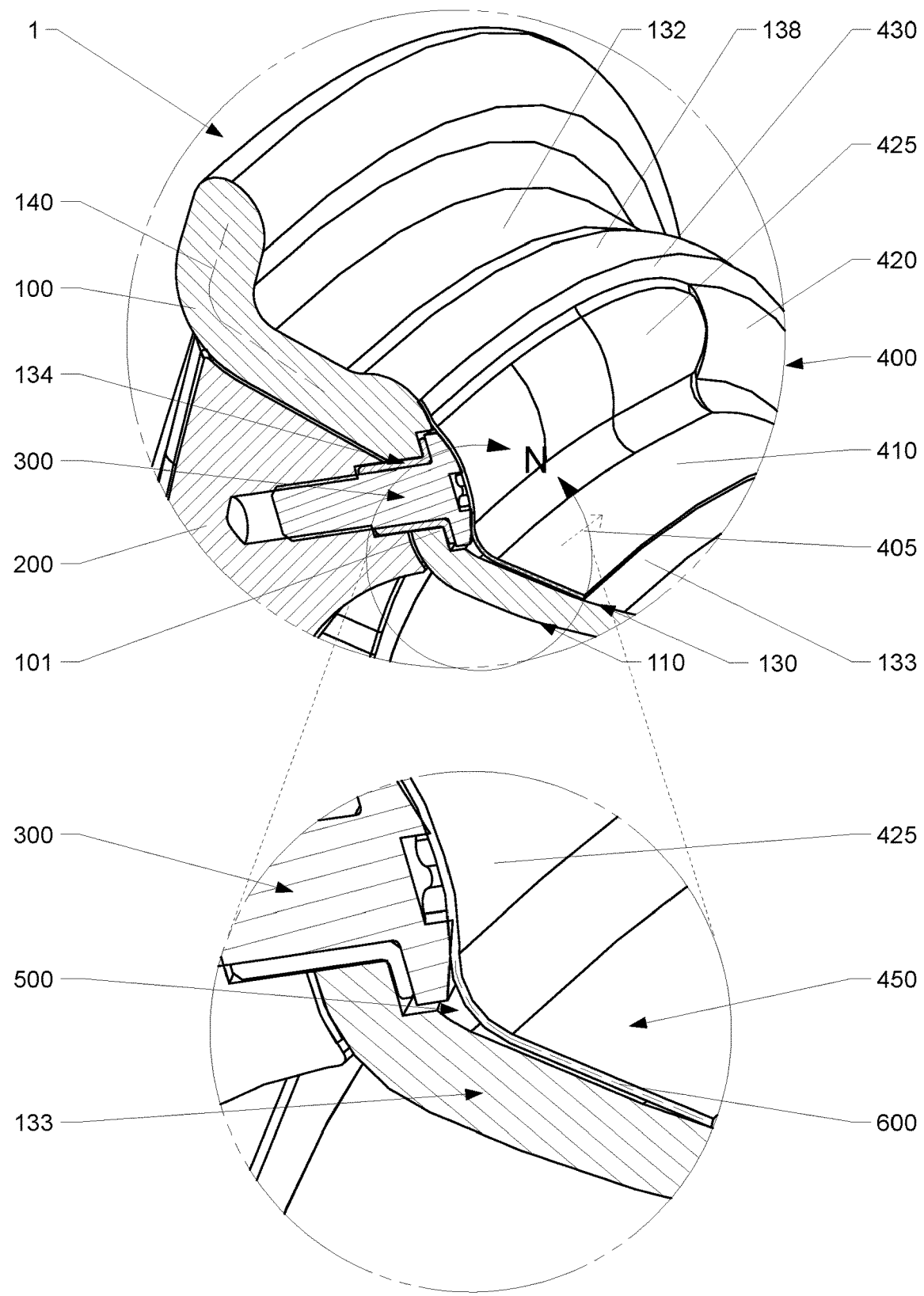
FIG. 5 schematically shows an embodiment of a wheel according to the present invention, the wheel being partially clipped for illustrative purposes.
Figure 6:
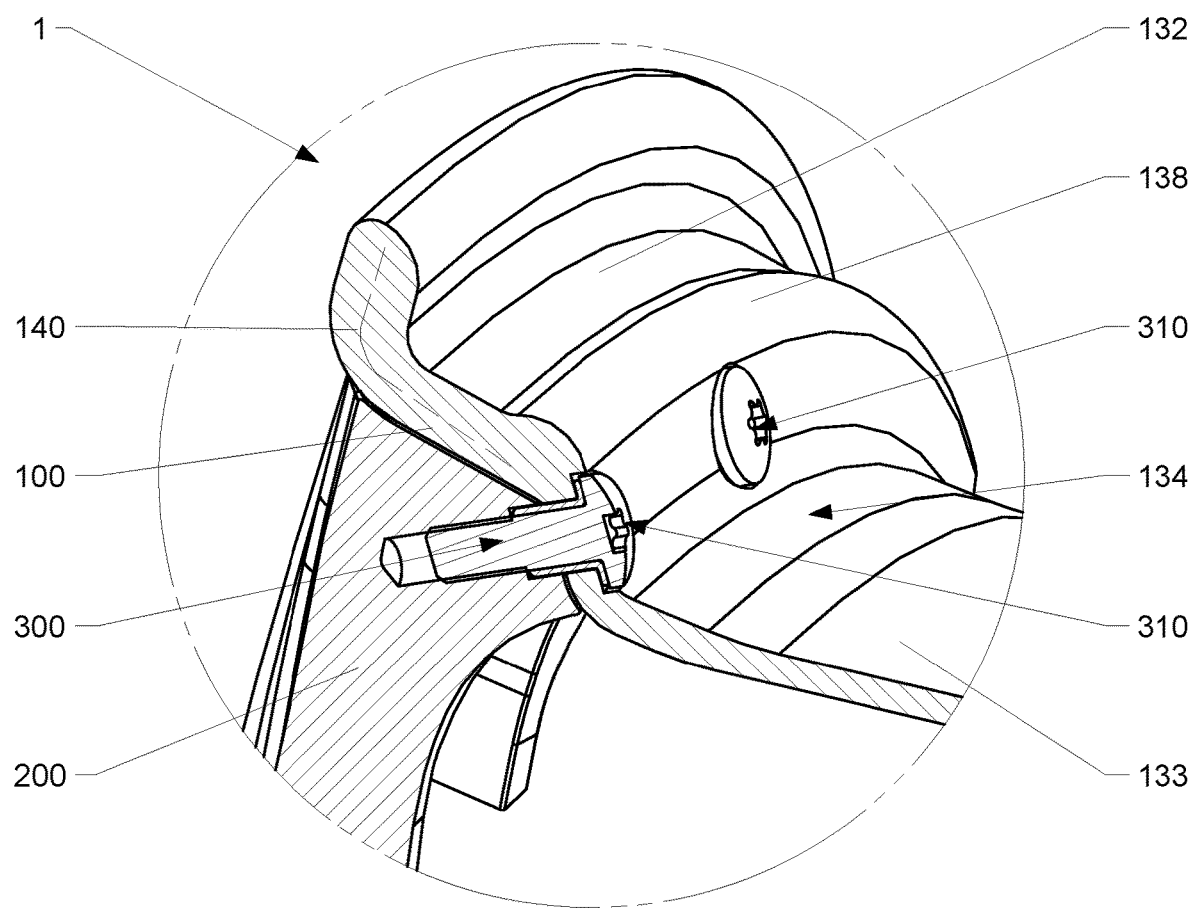
FIG. 6 schematically shows the embodiment of FIG. 5, the annular cover means being removed for illustrative purposes.

As shown in FIGS. 5 and 6 (where the annular cover means 400 has been removed for illustrative purposes), the wheel 1 may comprise a rim 100 with fiber reinforcement 140 that is interconnected with a wheel center 200 by means of screws 300 which are partially screwed into the wheel center 200 and penetrate the rim 100 via an opening 101 arranged in the rim and extending from the inner side 110 to the outer side 130 of the rim 100. In the embodiment shown, the screws 300 comprise screw heads 310 that are partially embedded in bores arranged in the rim 100. The screws 300 are arranged at a transition area 134 between the rim's well 133 and the second rim shoulder 132, whereby the screw heads 310 protrude from the surface of the rim 100. As can be seen in FIG. 5, an annular cover means or "cover" 400 is arranged at the outer side 130 of the rim such that it covers the screw heads 100. The annular cover means 400 comprises multiple recess cavities 425 arranged to receive the screw heads 310. As schematically shown the recess cavity 425 is interconnected to the first and the second and the third transition means 410, 420, 430 by means of a chamfer chamfers in order to support fitting of a tire (not shown) on the wheel 1. A sealing layer 450 along the rim 100 and reinforcing fibers 600 in the cover means 400 are additionally shown in FIG. 5.

Rather, the words used in the specification are words of description rather than limitation, and it is understood that various changes may be made without departing from the Spirit and scope of the invention.

The invention claimed is:
1. A wheel (1) comprising:
 a. a rim (100)
  i. at least partially made from a fiber reinforced plastic;
  ii. the rim (100) having an inner side (110) facing a hub region (2) of the wheel (1); and
  iii. an outer side (130) facing radially away from the hub region (2) of the wheel (1) whereby
   1. the outer side (130) comprises a well (133) which is interconnected with
   2. an outer shoulder (132) through a
   3. transition area (134); and
 b. a wheel center (200) interconnected with the inner side (110) of the rim (100) with at least one fastener (300);
  i. the at least one fastener (300) penetrating the rim (100) through at least one opening (101) that extends from the inner side (110) of the rim (100) to the outer side (130) of the rim (110); and
 c. an annular cover (400) arranged at the outer side (130) of the rim (100) in a circumferential direction around the wheel and thereby covering the at least one fastener (300) and/or the at least one opening (101), wherein the cover (400) comprises at least one recess cavity (425) to receive at least part of the fastener (300).

2. The wheel (1) according to claim 1, wherein the annular cover (400) comprises a first transition part (410) that aligns with the well (133) and a second transition part (420) that at least partially aligns with the transition area (134).

3. The wheel (1) according to claim 2, wherein the first transition part (410, 430) is formed as a cylindrical ring and the second transition part (420) is formed as a conical ring.

4. The wheel (1) according to claim 2 wherein a third transition part (430) aligns with an outer hump (138) of the outer shoulder (132).

5. The wheel (1) according to claim 1, wherein the fastener (300) comprises a screw or a rivet, the head (310) of which being at least partially arranged in the recess cavity (420).

6. The wheel (1) according to claim 4, wherein the recess cavity (425) blends into the first and/or the second and/or the third transition part (410, 420, 430) through a chamfer and/or a fillet.

7. The wheel according to claim 2, wherein the at least one recess cavity (425) is arranged at the second transition part (420).

8. The wheel (1) according to claim 1, wherein the annular cover (400) is at least partially made from a fiber reinforced plastic.

9. The wheel (1) according to claim 8, wherein the annular cover (400) comprises fibers that are arranged primarily in a circumferential direction of the wheel (1).

10. The wheel (1) according to claim 1, wherein the annular cover (400) comprises at least one sealing layer that is impermeable to pressurized air.

11. The wheel (1) according to claim 10, wherein the sealing layer is an outer coating of the at least one annular cover (400).

12. The wheel (1) according to claim 1, wherein the annular cover (400) comprises an outer coating that is at least partially made from a material having a low coefficient of friction.

13. The wheel (1) according to claim 1, wherein the annular cover (400) is interconnected with the rim (100) with an adhesive agent (500).

14. The wheel (1) according to claim 13, wherein the adhesive agent (500) is at least partially formed as film that extends over an interfacial region between the annular cover (400) and the rim (100).

15. An annular cover (400) according to claim 1.

* * * * *